R. F. PICARD.
PRISM GLASSES.
APPLICATION FILED JAN. 25, 1911.

1,009,259.

Patented Nov. 21, 1911.
2 SHEETS—SHEET 1.

WITNESSES
W. P. Burk
John C. Sanders

INVENTOR
Raymond F. Picard
BY
[signature]
ATTY.

R. F. PICARD.
PRISM GLASSES.
APPLICATION FILED JAN. 25, 1911.

1,009,259.

Patented Nov. 21, 1911.
2 SHEETS—SHEET 2.

WITNESSES
W. P. Burke
John C. Sanders

INVENTOR
Raymond F. Picard
BY
ATT'Y

UNITED STATES PATENT OFFICE.

RAYMOND FRANÇOIS PICARD, OF PARIS, FRANCE, ASSIGNOR TO SOCIÉTÉ PICARD & PÉTOT, OF PARIS, FRANCE.

PRISM-GLASSES.

1,009,259.  Specification of Letters Patent.  Patented Nov. 21, 1911.

Application filed January 25, 1911. Serial No. 604,634.

*To all whom it may concern:*

Be it known that I, RAYMOND FRANÇOIS PICARD, of 32 Rue de la Fontaine-au-Roi, in the city of Paris, Republic of France, have invented Prism-Glasses, of which the following is a full, clear, and exact description.

In prism-glasses it is very important that the optical axes should be rigorously parallel and remain parallel when the relative position of the two bodies is being varied for bringing the eye-pieces to the spacing apart of the eyes. For varying the spacing apart of the bodies, the ordinary glasses comprise a device constituted by two joint-branches secured to the two ends of the bodies. It suffices for one of these branches to be badly adjusted to destroy the parallel position of the optical axes during the rotary movement of the bodies about the axes of the joints. Now, it is difficult to secure the branches on the bodies and to center their joints so that these branches be perfectly parallel and that the axes of the joints coincide exactly, unless a precision adjustment be made which renders the manufacture very costly. Moreover, in the ordinary glasses, access to the prisms is very difficult and by trying to clean them, there is a risk of destroying the adjustment of the glasses.

The invention has for its object the production of prism-glasses, in which the position of the optical axes is determined with precision by construction and in which these axes remain rigorously parallel, without the manufacture requiring any special precaution or care. In these new glasses, the adjustment of the prisms is obtained very conveniently, and once it is effected, the adjustment of the glasses cannot be destroyed. Moreover the cleaning of the prisms is very easy. These glasses are essentially characterized by this fact that they comprise a single branch, with joints, located in the middle of the bodies, constituting in each body a kind of plate on which are secured the prisms, and tubes serving to support the objectives and the tubes carrying the eye-pieces. The prisms and these tubes are surrounded by removable sleeves, fitting on each side of the plates, and constituted by the two parts of the branch; these sleeves constitute the casing of the bodies of the glasses.

The invention is illustrated, by way of example, in the accompanying drawings, in which:—

Figure 1:
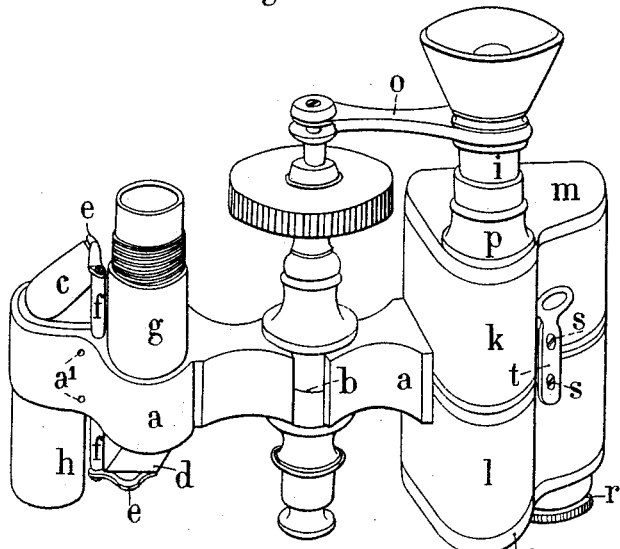
Figures 2, 3:
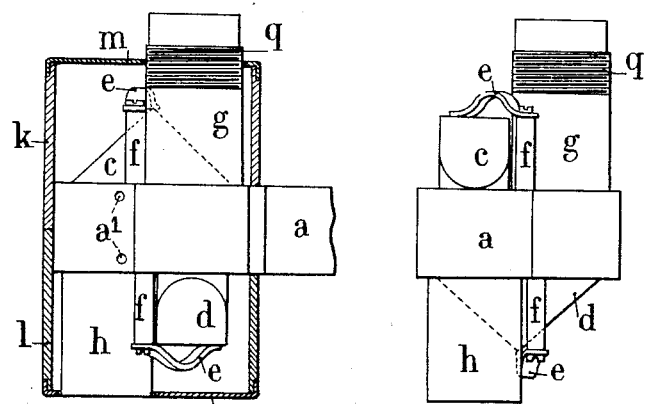
Figure 4:
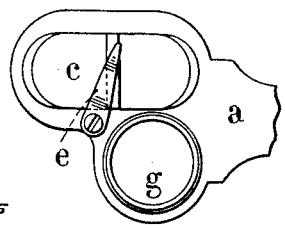

Figure 1 shows the glasses in perspective view, one of the bodies being taken to pieces, in order to illustrate the inner arrangement; Fig. 2 is a vertical section of a part of one of the bodies of the glasses; Fig. 3 is a side view and Fig. 4 a corresponding plan view; Figs. 5, 6, 7, 8, 9, 10, 11 and 12 show separately the removable parts of one of the bodies.

As illustrated in the drawings, Fig. 1, the new glasses comprise a single branch constituted by two metallic members $a$ hinged together at $b$. Each of these members constitutes a kind of floor or plate the two faces of which are perfectly planed and parallel to one another. The hinge is countersunk so that the axis of the joint $b$ is rigorously perpendicular to the plane of the faces. This result can be obtained mechanically, without requiring precision work on the part of the workmen. On each member $a$ are permanently mounted the two prisms $c$ and $d$. These prisms are glued when their position has been suitably adjusted; besides, they are maintained by strong springs $e$ secured on supports $f$. On these members $a$ are also secured two tubes $g$ and $h$. In the tubes $g$ can slide the tubes $i$ carrying the eye-pieces. To the end of the tubes $h$ are screwed the objectives inserted in rings $j$.

The casing of the bodies is constituted by sleeves $k$ $l$ which fit on to the members $a$ and by covers $m$ $n$. The sleeves and their covers are maintained upon the side toward the eye-pieces by rings $p$ screwed on a screw threaded part $q$ of the tubes $g$, Fig. 2, and upon the side toward the objectives by rings $r$ screwed on the rings $j$. Moreover, the sleeves are maintained by screws $s$ which are secured on the members $a$ by entering into screw threaded holes $a^1$; these screws serve at the same time to secure the small plates $t$ to which is attached the strap.

By reason of the arrangement which has just been described, the optical axes are by construction at right angles to the faces of the members $a$; the axis of the joint being also by construction at right angles to these faces, the optical axes always remain at right angles to the faces of the members $a$ and parallel to one another. As the planing of two parallel faces and countersinking at right angles to these faces is ordinary work, the manufacture can be made economically and, moreover, the glasses thus made up have more precision than the ordinary glasses which require a costly adjustment.

The adjustment of the position of the prisms is effected very conveniently, by putting into place the objectives and eye-pieces, but by leaving out the sleeves $k$ $l$.

Figure 5:
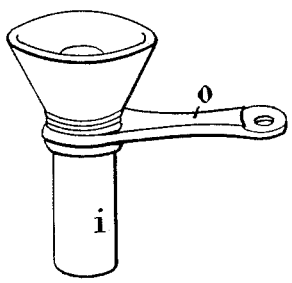
Figure 6:
Figure 7:
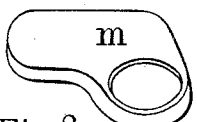
Figure 8:
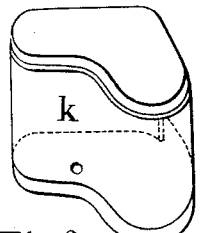
Figure 9:
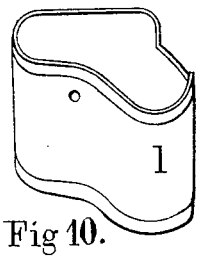
Figure 11:
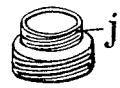
Figure 12:
Figure 10:
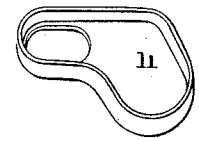

The glasses being set up, as shown in Fig. 1 for the right hand side body, if it is desired to clean the prisms, the eye-pieces are removed, by taking out the screw which secures the branches $o$ acting on the eye-pieces, which allows of separating each tube $i$ carrying the eye-piece, as shown in Fig. 5. The screws $s$ which secure the small plates $t$ and the sleeves $k$ $l$ are also removed. Then the ring $p$ is unscrewed, Figs. 1 and 6. The cover $m$, Fig. 7, and the sleeve $k$, Fig. 8, can then be removed. In the same way, the objective is removed by unscrewing the ring $r$, Figs. 1 and 12, and then the ring $j$, Fig. 11, in which the objective is set; then the cover $n$, Fig. 10, and the sleeve $l$, Fig. 9, are removed. The prisms are then seen as shown in Fig. 1 on the left hand side body. The said prisms can be conveniently cleaned without interfering in any way.

Of course, if only the prisms located toward the side of the objectives are to be cleaned, or only those located toward the side of the eye-pieces, only the members located toward the same side are taken off and in particular, it suffices in this case to remove but one of the two screws $s$. The resetting is effected in the reverse way.

Claims.

1. In prism-glasses, two hinged members constituting a single branch, the ends of these members being provided with flat parallel faces against which the prisms rest.

2. In prism-glasses, two hinged members constituting a single branch, the ends of these members being provided with flat parallel faces against which the prisms rest, and tubes carrying the objectives and the eye-pieces.

3. In prism-glasses, two hinged members constituting a single branch, prisms secured on these members, tubes secured on these members and receiving the objectives and the tubes carrying the eye-pieces, and removable sleeves surrounding the prisms and the tubes.

4. In prism-glasses, two hinged members constituting a single branch, prisms secured on these members, tubes secured on these members and receiving the objectives and the tubes carrying the eye-pieces, removable sleeves surrounding the prisms and the tubes, and covers fitting on the sleeves.

5. In prism-glasses, two hinged members constituting a single branch, prisms secured on these members, tubes secured on these members and receiving the objectives and the tubes carrying the eye-pieces, removable sleeves surrounding the prisms and the tubes, covers fitting on the sleeves, and screw threaded rings holding together the covers and the sleeves.

6. In prism-glasses, two hinged members constituting a single branch, prisms secured on these members, tubes secured on these members and receiving the objectives and the tubes carrying the eye-pieces, removable sleeves surrounding the prisms and the tubes, covers fitting on the sleeves, screw threaded rings holding together the covers and the sleeves, and screws securing the sleeves on the hinged members.

7. In prism-glasses, two hinged members constituting a single branch, prisms secured on these members, tubes secured on these members and receiving the objectives and the tubes carrying the eye-pieces, removable sleeves surrounding the prisms and the tubes, covers fitting on the sleeves, screw threaded rings holding together the covers and the sleeves, and screws securing the small plates for the strap and at the same time the sleeves.

The foregoing specification of my prism-glasses signed by me this thirteenth day of January 1911.

RAYMOND FRANÇOIS PICARD.

Witnesses:
  DEAN B. MASON,
  R. EHIRIOT.